(12) United States Patent
Sakano et al.

(10) Patent No.: US 7,101,596 B2
(45) Date of Patent: Sep. 5, 2006

(54) LIQUID CRYSTAL SEALANT, LIQUID CRYSTAL DISPLAY DEVICE USING THE SAME AND METHOD FOR PRODUCING THE DEVICE

(75) Inventors: Tsunetoshi Sakano, Kawasaki (JP); Syouichi Hayasibara, Saitama (JP); Yasumasa Akatuka, Saitama (JP); Masahiro Hirano, Ageo (JP); Tsuyoshi Okazaki, Nara (JP); Toshihiro Matsumoto, Nara (JP); Nobuhiro Waka, Matsusaka (JP); Shogo Nishiwaki, Matsusaka (JP)

(73) Assignees: Nippon Kayaku Kabushiki Kaisha, Tokyo (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/010,798

(22) Filed: Dec. 13, 2004

(65) Prior Publication Data

US 2005/0181145 A1 Aug. 18, 2005

Related U.S. Application Data

(63) Continuation of application No. PCT/JP04/15232, filed on Oct. 15, 2004.

(30) Foreign Application Priority Data

| Oct. 17, 2003 | (JP) | ............................ 2003-357529 |
| Jun. 30, 2004 | (JP) | ............................ 2004-192772 |
| Aug. 25, 2004 | (JP) | ............................ 2004-244571 |

(51) Int. Cl.
- *C09K 19/52* (2006.01)
- *G02F 1/1339* (2006.01)
- *B32B 37/14* (2006.01)
- *C08L 63/00* (2006.01)

(52) U.S. Cl. ..................... 428/1.53; 428/1.5; 428/1.51; 428/1.52; 428/1.1; 252/299.01; 523/440; 525/31; 156/275.5; 349/153

(58) Field of Classification Search .............. 252/299.5, 252/299.01; 428/1.53, 1.1, 1.5, 1.51, 1.52; 349/153; 525/523, 31; 156/330, 275.5; 523/440; C08G 59/00; G02F 1/1339
See application file for complete search history.

(56) References Cited

U.S. PATENT DOCUMENTS

| 6,120,858 A * | 9/2000 | Hirano et al. ............... 428/1.53 |
| 6,555,187 B1 * | 4/2003 | Kitamura .................... 428/1.53 |
| 6,673,441 B1 * | 1/2004 | Tanaka et al. .......... 428/355 EP |
| 6,838,170 B1 * | 1/2005 | Tanaka et al. .......... 428/355 EP |
| 6,913,798 B1 * | 7/2005 | Kitamura et al. .......... 428/1.53 |

FOREIGN PATENT DOCUMENTS

| JP | 52-83616 | 7/1977 |
| JP | 5-262850 | 10/1993 |
| JP | 6-214239 | 8/1994 |
| JP | 10-273644 | * 10/1998 |
| JP | 10-274775 | 10/1998 |
| JP | 11-15005 | 1/1999 |
| JP | 11-246743 | 9/1999 |
| JP | 2001-142079 | 5/2001 |
| JP | 2002-284845 | 10/2002 |
| JP | 2003-55439 | 2/2003 |
| JP | 2004-10674 | 1/2004 |

OTHER PUBLICATIONS

English abstract for JP 2004-244515.*
English abstract for JP 2001-75109.*
English translation by computer for JP 2002-284845, http://www4.ipdl.ncipi.go.jp/Tokujitu/PAJdetail.ipdl?N0000=60&N0120=01&N2001=2&N3001=2002-284845.*
English translation by computer for JP 2003-55439, http://www4.ipdl.ncipi.go.jp/Tokujitu/PAJdetail.ipdl?N0000=60&N0120=01&N2001=2&N3001=2003-055439.*
English translation by computer for JP 2002-284845,http://www4.ipdl.ncipi.go.jp/Tokujitu/PAJdetail.ipdl?N0000=60&N0120=01&N2001=2&N3001=2002-284845.*
English translation by compture for JP 2003-055439,http://www4.ipdl.ncipi.go.jp/Tokujitu/PAJdetail.ipdl?N0000=60&N0120=01&N2001=2&N3001=2003-055439.*
Derwent abstract for JP 10273644, 1998.*

* cited by examiner

*Primary Examiner*—Shean C Wu
(74) *Attorney, Agent, or Firm*—Nields & Lemack

(57) ABSTRACT

A liquid crystal sealant comprising an epoxy resin represented by the following formula (1):
[Formula 1]

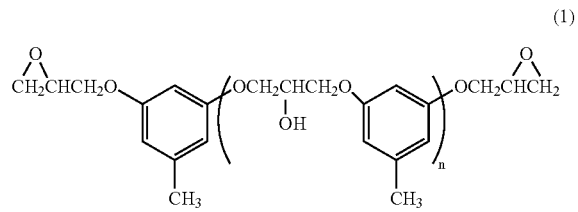

(in the formula, n denotes an average polymerization degree and is a positive number of 0–5) as a resin component, a curing agent, a curing accelerator and an inorganic filler is excellent in screen printability as a liquid crystal sealant in making a liquid crystal display device and can provide excellent reliability in moisture resistance for the liquid crystal display device obtained).

17 Claims, 1 Drawing Sheet

LIQUID CRYSTAL SEALANT, LIQUID CRYSTAL DISPLAY DEVICE USING THE SAME AND METHOD FOR PRODUCING THE DEVICE

CROSS-REFERENCES TO RELATED APPLICATIONS

This application is a continuation application of International Application No. PCT/JP2004/015232 filed on Oct. 15, 2004, the contents of which are hereby incorporated by reference.

BACKGROUND OF THE INVENTION

1. Field of the Invention

The present invention relates to a liquid crystal sealant, a liquid crystal display device using the same, and a method for producing the device. More particularly, it relates to a heat-curable liquid crystal sealant which is excellent in screen printability in producing a liquid crystal display device and can provide a liquid crystal display device high in reliability in moisture resistance, a liquid crystal display device produced using the sealant, and a method for producing the device.

2. Description of the Related Art

In producing a liquid crystal display device using a heat-curable liquid crystal sealant, the upper and lower substrates are laminated by a process which comprises coating the liquid crystal sealant on the substrates by a dispenser or a method such as screen printing, then usually pre-curing (volatilization of solvent) the coat by heating, thereafter putting the upper and lower substrates together in high precision using an alignment mark, and then hot pressing the sealant.

Recently, in producing liquid crystal display devices, substrates become larger in size and tact time (time required for one step) is shortened for further increasing the mass-productivity. The registration step for the upper and lower substrates in laminating the upper and lower glass substrates of a color filter substrate and an array substrate after the pre-curing step is also required to be high in speed and precision. With increase in the size of substrates, especially in the case of beveling for liquid crystal panels of portable telephones, the coating area of the liquid crystal sealant increases, which requires a large torque at the time of registration to cause increase of tact time.

Furthermore, in producing liquid crystal display devices, there is a step of carrying the laminated upper and lower substrates to the subsequent processing step in such a state as the liquid crystal sealant being uncured after the steps of lamination, registration and pre-curing of the upper and lower glass substrates of a color filter substrate and an array substrate. When they are carried by vacuum chucking the upper substrate of the laminated upper and lower substrates which is called vacuum chucking method, there sometimes occur slippage or separation of the laminated upper and lower substrates from each other owing to low tackiness of the liquid crystal sealant. This problem becomes serious with increase of the weight of substrates caused by the recent increase of the size of substrates.

Moreover, with recent increase in minuteness of liquid crystal display devices and response speed of liquid crystal compositions and narrowing of frames, liquid crystal sealants are demanded to have high adhesion and reliability in moisture resistance. Unless the liquid crystal sealants are excellent in reliability in moisture resistance, water contained in air infiltrates through the liquid crystal sealants to contaminate the liquid crystal composition in the liquid crystal display device, resulting in inferior display.

Liquid crystal sealants excellent in adhesion and reliability in moisture resistance are disclosed, for example, in JP-A-11-15005. However, since these liquid crystal sealants disclosed in Patent Document 1 are high in viscosity after pre-curing, operability of registration after lamination of the substrates is insufficient or they are inferior in tackiness after pre-curing, and hence there is a possibility of occurrence of slippage of the upper and lower substrates during vacuum chucking type carrying operation.

Thus, it is strongly demanded to develop liquid crystal sealants which are excellent in adhesiveness and reliability in moisture resistance, high in registration operability at the time of lamination, and do not cause slippage or separation of substrates in vacuum chucking type carrying operation.

BRIEF SUMMARY OF THE INVENTION

The present invention provides a heat-curable liquid crystal sealant which can be coated by screen printing and dispensation coating, requires only a short time for the registration step at the time of lamination of the upper and lower substrates in making a liquid crystal display device, causes no separation of the upper and lower substrates when the upper and lower substrates laminated with uncured liquid crystal sealant is carried by vacuum chucking and elevating the upper substrate by the vacuum chucking method, and is very low in liquid crystal contamination and high in water and moisture resistance.

As a result of an intensive research conducted by the inventors in an attempt to solve the above problems, the present invention has been accomplished.

That is, the present invention relates to a liquid crystal sealant, characterized by comprising an epoxy resin represented by the following formula (1):

[Formula 1]

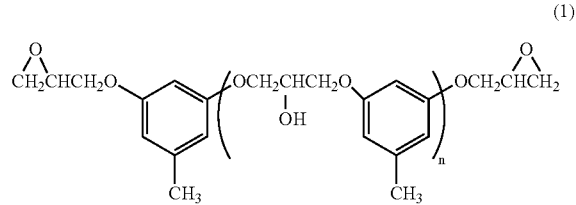

(in the above formula, n represents an average polymerization degree and is a positive number of 0–5), a curing agent, a curing accelerator and an inorganic filler.

Furthermore, the present invention relates to a liquid crystal display device which is sealed using the above liquid crystal sealant.

Moreover, the present invention relates to a method for producing a liquid crystal display device having a liquid crystal material interposed between a substrate having a color filter layer and a substrate having a liquid crystal orientation layer on an electrode layer and held with a liquid crystal sealant, characterized by including a step of coating the liquid crystal sealant on one of the substrates by screen printing, a step of hot-press bonding another substrate, and a step of pouring the liquid crystal material into the space between the substrates.

The epoxy resin represented by the above formula (1) used in the liquid crystal sealant of the present invention has a feature that it is low in viscosity with maintaining the glass transition temperature of conventional epoxy resins. Therefore, the liquid crystal sealant containing the epoxy resin has a low resin viscosity and an excellent tackiness upon removing the solvent. As a result, the resin viscosity of the liquid crystal sealant is low at the lamination of the upper and lower substrates in producing the liquid crystal display device, the load of press at lamination is small, the registration step can be shortened, there occurs no separation of the upper and lower substrates when the upper and lower substrates laminated with uncured liquid crystal sealant are carried by elevating the upper part of the laminated substrates by the vacuum chucking method, and furthermore, the gap can be easily formed at the pressing. Moreover, a liquid crystal display device markedly excellent in water and moisture resistance and very high in strength can be produced.

DETAILED DESCRIPTION OF THE INVENTION

Figure 1:
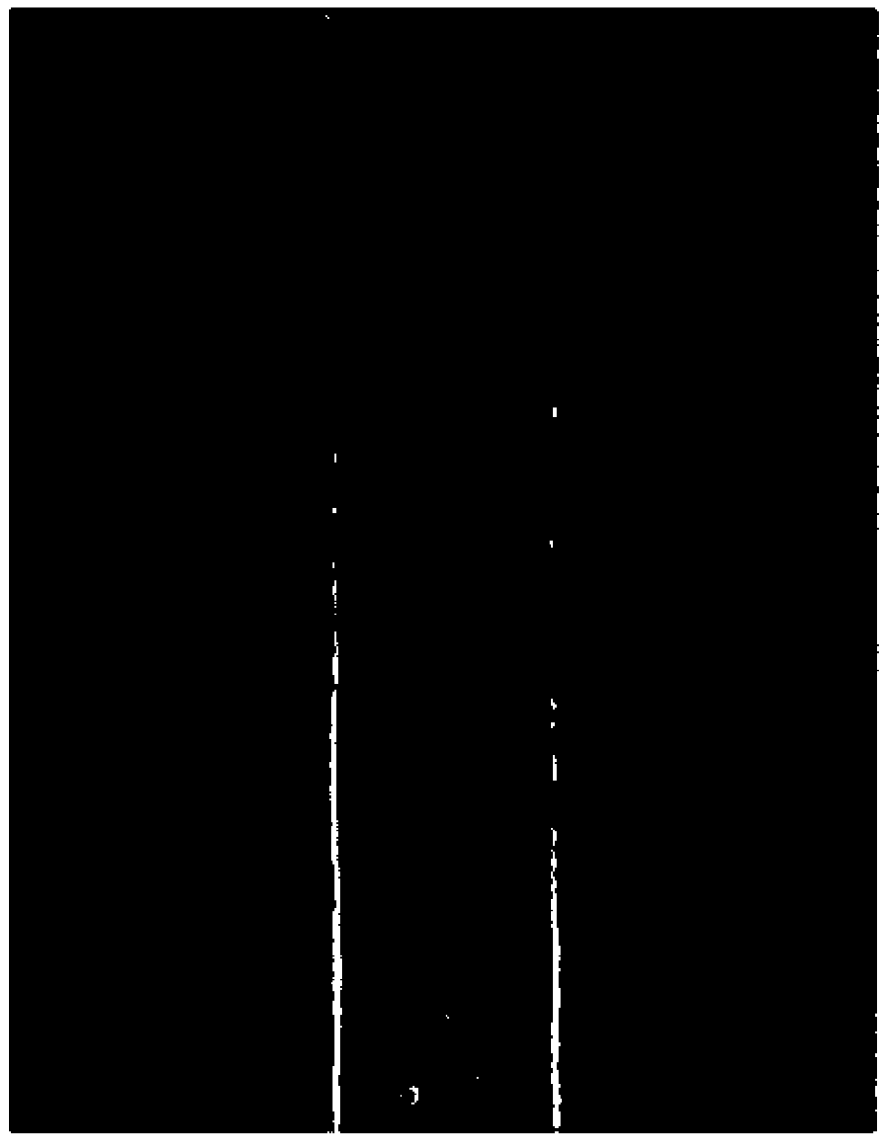
FIG. 1 is a photograph of a glass substrate on which the liquid crystal sealant of Example 3 of the present invention was screen printed which was taken from the above of the substrate.

The liquid crystal sealant of the present invention contains an epoxy resin represented by the above formula (1), a curing agent, a curing accelerator and an inorganic filler as essential components.

The epoxy resin represented by the formula (1) used in the liquid crystal sealant of the present invention can be produced, according to a conventional method, by reacting 5-methylresorcin with epichlorohydrin in the presence of, for example, an alkali metal hydroxide such as sodium hydroxide. If the content of the compound of the formula (1) where n is 0 is high, the viscosity tends to decrease, but if it is too high, crystallization readily occurs, and hence the epoxy resin preferably contains a compound of the formula (1) where n is 0 in an amount of usually 50–95% by weight, preferably 50–80% by weight. An example of such epoxy resin is RE-600NM manufactured by Nippon Kayaku Co., Ltd.

The content of the epoxy resin in the liquid crystal sealant of the present invention is 5–60% by weight, preferably 20–55% by weight, more preferably 30–50% by weight.

The liquid crystal sealant of the present invention may contain an epoxy resin other than the epoxy resin of the formula (1) in such an amount as not affecting the operability and physical properties of the liquid crystal sealant. The epoxy resin other than the epoxy resin of the formula (1) is not particularly limited, and examples thereof are bisphenol A type epoxy resins; bisphenol F type epoxy resins; polyfunctional epoxy resins which are glycidyl etherification products of polyphenol compounds such as bisphenol S, 4,4-biphenylphenol, 2,2,6,6-tetramethyl-4,4-biphenylphenol, 2,2-methylene-bis(4-methyl-6-tert-butylphenol), trishydroxyphenylmethane, pyrogallol, phenols having a diisopropylidene skeleton, phenols having a fluorene skeleton, e.g., 1,1-di-4-hydroxyphenylfluorene, and phenolated polybutadienes; novolak resins prepared using, as starting materials, various phenols such as phenol, cresols, ethylphenols, butylphenols, octylphenols, bisphenol A, bisphenol F, bisphenol S and naphthol; phenol novolak resins having a xylylene skeleton; phenol novolak resins having dicyclopentadiene skeleton; glycidyl etherification products of various novolak resins such as phenol novolak resins having a fluorene skeleton; alicyclic epoxy resins having an aliphatic skeleton such as cyclohexane; heterocyclic epoxy resins having heterocyclic ring such as isocyanuric ring or hydantoin ring; glycidylation products of brominated phenols such as brominated bisphenol A, brominated bisphenol F, brominated bisphenol S, brominated phenol novolak and brominated cresol novolak; and generally produced and commercially available epoxy resins such as N,N-diglycidyl-o-toluidine, N,N-diglycidylaniline, phenylglycidyl ether, resorcinoldiglycidyl ether, 1,6-hexanedioldiglycidyl ether, trimethylolpropanetriglycidyl ether, polypropylene glycol diglycidyl ether, (3,4-3,4-epoxycyclo)hexylmethylhexane carboxylate and hexahydrophthalic anhydride diglycidyl ester. These epoxy resins are used in such an amount as not affecting the operability and physical properties of the resulting liquid crystal sealant. These epoxy resins may also be used in admixture of two or more.

In the liquid crystal sealant of the present invention, it is preferred to use a bisphenol A type epoxy resin in combination with the epoxy resin of the formula (1). By using the bisphenol A type epoxy resin in combination, the epoxy resin of the formula (1) gives a liquid crystal sealant having a viscosity suitable for screen printing and having excellent physical properties of cured products such as reliability in moisture resistance. Examples of usable bisphenol A type epoxy resin include RE-310S manufactured by Nippon Kayaku Co., Ltd. The weight ratio of the epoxy resin represented by the formula (1): the bisphenol A type epoxy resin is 20:80–40:60 (part by weight), more preferably 25:75–35:65 (part by weight).

As the curing agent used in the liquid crystal sealant of the present invention, novolak resins are generally used. As examples of the novolak resins, mention may be made of novolak resins obtained, using as starting materials, various phenols, e.g, bisphenol A, tetrabromobisphenol A, bisphenol F, bisphenol S, 4,4-biphenylphenol, 2,2,6,6-tetramethyl-4,4-biphenylphenol, 2,2-methylene-bis(4-methyl-6-tert-butylphenol), trishydroxyphenylmethane, pyrogallol, phenols having a diisopropylidene skeleton, phenols having a fluorene skeleton such as 1,1-di-4-hydroxyphenylfluorene, polyphenol compounds such as phenolated polybutadiene, phenol, cresols, ethylphenols, butylphenols, octylphenols, bisphenol A, allyl phenols, brominated bisphenol A, bisphenol F, bisphenol S and naphthol; phenolic novolak resins such as phenol novolak resins having a xylylene skeleton, phenol novolak resins having dicyclopentadiene skeleton and phenol novolak resins having a fluorene skeleton; and phenolic novolak resins obtained by linking various phenols such as phenol, cresols, ethylphenols, butylphenols, octylphenols, bisphenol A, brominated bisphenol A, bisphenol F, bisphenol S and naphthol with one of the crosslinking groups (aralkylene groups) represented by the following formulas (2)–(4):

[Formula 2]

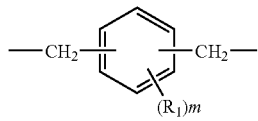
(2)

(in the above formula, $R_1$ represents a hydrogen atom, an alkyl group of 1–4 carbon atoms, an allyl group or a halogen atom and m represents an integer of 1–4, and when m is 2 or more, $R_1$'s may be the same or different),

[Formula 3]

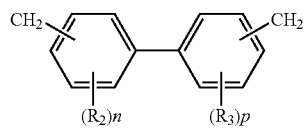
(3)

(in the above formula, $R_2$ and $R_3$ independently of one another represent a hydrogen atom, an alkyl group of 1–4 carbon atoms, an allyl group or a halogen atom, and n and p represent an integer of 1–4, and when n or p is 2 or more, $R_2$'s and $R_3$'s may be the same or different),

[Formula 4]

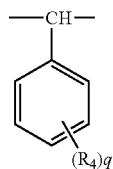
(4)

(in the above formula, $R_4$ represents a hydrogen atom, an alkyl group of 1–8 carbon atoms, an allyl group, a halogen atom or a hydroxyl group and q represents an integer of 1–5, and when q is 2 or more, $R_4$'s may be the same or different).

Preferred are novolak resins obtained using, as starting materials, various phenols such as phenol, cresols, ethylphenols, butylphenols, octylphenols, bisphenol A, allyl phenols, bisphenol F, bisphenol S and naphthol, phenol novolak resins having a xylylene skeleton, phenol novolak resins having a dicyclopentadiene skeleton, phenol novolak resins having a fluorene skeleton, and phenolic novolak resins obtained by linking various phenols such as phenol, cresols, ethylphenols, butylphenols, octylphenols, bisphenol A, brominated bisphenol A, bisphenol F, bisphenol S and naphthol with one of the crosslinking groups (aralkylene groups) represented by the following formulas (5)–(7):

[Formula 5]

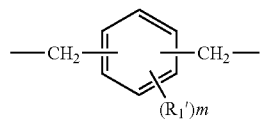
(5)

(in the above formula, $R_{1'}$ represents a hydrogen atom or an alkyl group of 1–4 carbon atoms, and m represents an integer of 1–4, and when m is 2 or more, $R_{1'}$'s may be the same or different),

[Formula 6]

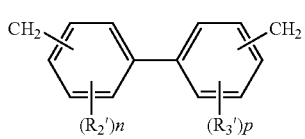
(6)

(in the above formula, $R_{2'}$ and $R_{3'}$ independently of one another represent a hydrogen atom or an alkyl group of 1–4 carbon atoms, n and p represent an integer of 1–4, and when n or p is 2 or more, $R_{2'}$'s and $R_{3'}$'s may be the same or different),

[Formula 7]

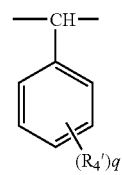
(7)

(in the above formula, $R_{4'}$ represents a hydrogen atom, an alkyl group of 1–8 carbon atoms or a hydroxyl group and q represents an integer of 1–5, and when q is 2 or more, $R_{4'}$'s may be the same or different).

More preferred are novolak resins obtained using, as starting materials, various phenols such as phenol, cresols, octylphenols, bisphenol A, bisphenol F, bisphenol S and naphthol, and phenolic novolak resins obtained by linking various phenols such as phenol, cresols, octylphenols, bisphenol A, bisphenol F, bisphenol S and naphthol with one of the crosslinking groups (aralkylene groups) represented by the above formulas (5)–(7).

Particularly preferred are novolak resins obtained using monophenols as starting materials, such as phenol novolak resins obtained using phenol as a starting material and cresol novolak resins obtained using cresols as a starting material, and phenolic novolak resins obtained by linking various phenols such as phenol, cresols and bisphenol A with one of the crosslinking groups (aralkylene groups) represented by the following formulas (8)–(12):

[Formula 8]

(8)

—CH₂—⟨benzene⟩—CH₂—

[Formula 9]

(9)

—H₂C—⟨biphenyl⟩—CH₂—

[Formula 10]

(10)

—H₂C—⟨3,3',5,5'-tetramethylbiphenyl⟩—CH₂—

[Formula 11]

(11)

—CH—
|
⟨phenol⟩
|
OH

[Formula 12]

(12)

—CH—
|
⟨2-methyl-4-t-butylphenyl⟩
(CH₃, t-C₄H₉)

The preferred novolak resins used in the present invention are phenolic novolak resins prepared using monophenols as a starting material and are represented by the following general formula (13):

[Formula 13]

(13)

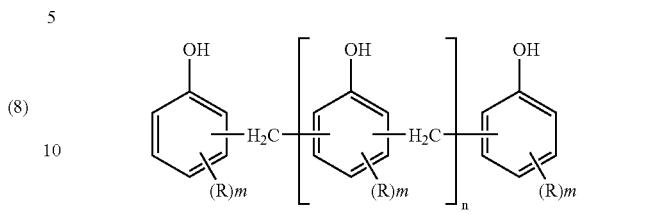

(in the above formula, R represents hydrogen, lower alkyl, lower alkoxy or halogen, m represents an integer of 1–3, and when m is 2 or 3, R's may be the same or different, and n denotes 0 or a positive integer).

In the above formulas (2)–(13), the alkyls of 1–4 carbon atoms include, for example, methyl, ethyl, n-propyl, isopropyl, n-butyl, isobutyl and t-butyl. The alkyls of 1–8 carbon atoms include, for example, methyl, ethyl, n-propyl, isopropyl, pentyl, hexyl and octyl. The lower alkyls are alkyls of 1–8 carbon atoms such as methyl, ethyl, n-propyl, isopropyl, n-butyl, isobutyl and t-butyl, preferably alkyls of 1–4 carbon atoms such as methyl, ethyl, n-propyl, isopropyl, n-butyl, isobutyl and t-butyl. The lower alkoxys are alkoxys of 1–8 carbon atoms such as methoxy, ethoxy, n-propoxy, isopropoxy, n-butoxy, isobutoxy and t-butoxy, preferably alkoxys of 1–4 carbon atoms such as methoxy, ethoxy, n-propoxy, isopropoxy, n-butoxy. The halogens include, for example, bromine, chlorine and fluorine. In the formula (13), the positive integer n is preferably 1–15, more preferably 1–10.

These novolak resins are used each alone or as a mixture of two or more. The amount of the novolak resin used in the present invention is 0.2–1.4 chemical equivalents, preferably 0.3–1.1 chemical equivalent, more preferably 0.4–0.9 chemical equivalent as equivalent of hydroxyl group in the novolak resin with respect to the epoxy equivalent of the epoxy resin in the liquid crystal sealant.

The curing agent comprising a phenolic novolak resin suitably usable in the present invention is a compound of the above formula (13). Since the component of n=1 or more in the formula (13) gives high resin viscosity, it is preferred that a component of n=0 (a compound having two rings) is present, and the amount of the component is usually about 20–80% by weight, preferably about 25–70% by weight, more preferably about 30–50% by weight in the novolak resin (the remainder being components of n=1 or more).

In the reaction of the phenolic novolak resin with the epoxy resin, a phenol novolak curing agent having three or more rings (for example, a compound of n=1 in the above formula (13)) forms a three-dimensional crosslinked structure upon curing, while a phenol novolak resin having two rings (for example, a compound of n=0 in the formula (13)) crosslinks in linear form, and hence gives flexibility to the rigid structure to improve adhesion to a glass substrate.

Furthermore, since the phenolic novolak resin suitably usable in the present invention is low in resin viscosity, it provides an excellent screen printability, and the upper and lower substrates can be easily laminated in production of the liquid crystal display device and formation of a gap becomes easier.

As the curing accelerators used in the present invention, mention may be made of, for example, imidazoles, salts of imidazoles with polycarboxylic acids such as phthalic acid, isophthalic acid, terephthalic acid, trimellitic acid, pyromellitic acid, naphthalenedicarboxylic acid, maleic acid and oxalic acid; amides such as dicyandiamide and salts of the amides with phenols, the above polycarboxylic acids or phosphinic acids; diaza compounds such as 1,8-diaza-bicyclo(5.4.0)undecene-7 and salts of the diaza compounds with phenols, the above polycarboxylic acids or phosphinic acids, phosphines such as triphenylphosphine and tetraphenylphosphoniumtetraphenyl borate, phenols such as 2,4,6-trisaminomethylphenol, and amine adducts.

As the imidazoles, mention may be made of, for example, 2-methylimidazole, 2-phenylimidazole, 2-undecylimidazole, 2-heptadecylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6(2'-methylimidazole(1'))ethyl-s-triazine, 2,4-diamino-6(2'-undecylimidazole(1'))ethyl-s-triazine, 2,4-diamino-6(2'-ethyl,4-methylimidazole(1'))ethyl-s-triazine, 2,4-diamino-6(2'-methylimidazole(1'))ethyl-s-triazine isocyanuric acid adduct, a 2:3 adduct of 2-methylimidazole and isocyanuric acid, an adduct of 2-phenylimidazole and isocyanuric acid, 2-phenyl-3,5-dihydroxymethylimidazole, 2-phenyl-4-hydroxymethyl-5-methylimidazole, and 1-cyanoethyl-2-phenyl-3,5-dicyanoethoxymethylimidazole.

Of these curing accelerators, preferred are, for example, 2,4-diamino-6(2'-methylimidazole(1'))ethyl-s-triazine isocyanuric acid adduct, a 2:3 adduct of 2-methylimidazole and isocyanuric acid, an adduct of 2-phenylimidazole and isocyanuric acid, salts of imidazoles with polycarboxylic acids such as phthalic acid, isophthalic acid, terephthalic acid, trimellitic acid, pyromellitic acid, naphthalenedicarboxylic acid, maleic acid and oxalic acid, and amine adducts.

The amount of the curing accelerators added is 1–25 parts by weight, preferably 2–20 parts by weight, more preferably 3–15 parts by weight based on 100 parts by weight of the epoxy resin in the liquid crystal sealant.

It is preferred to use these curing accelerators in the form of latent curing accelerators because they have merits such as improvement of operability (prolongation of pot life time). The latent curing accelerators are those which are solid at room temperature and react as curing accelerators only after being dissolved by heating, and include, for example, microcapsule type curing accelerators prepared by microencapsulating these curing accelerators, solid dispersion type curing accelerators (for example, imidazoles) which are hardly soluble in a solvent or epoxy resin, and amine adducts. It is especially preferred to use amine adducts as the curing accelerators from the points of one-pack storage stability when mixed with the epoxy resin and high reactivity in heating.

Among these curing accelerators, average particle diameter of the solid dispersion type latent curing accelerators is about 6 μm or less, preferably about 4 μm or less, more preferably about 3 μm or less measured by laser method. If latent curing accelerators of more than 6 μm in average particle diameter are used, it is difficult to perform dispenser coating, and besides the shape after coating is not uniform and the shape of seal after lamination of substrates is also not uniform. In the case of liquid crystal sealants using the curing accelerators of more than 6 μm in average particle diameter, curing of seal becomes ununiform, roughness due to fillers is recognized in the sealed portion, and exudation is apt to occur. The average particle diameter of the latent curing accelerators has no particular lower limit, and normally those of about 1.5–2.5 μm in lower limit are used.

The inorganic fillers used in the present invention include, for example, metal oxides such as alumina, silica, talc, clay, barium titanate, titanium oxide, cobalt oxide, magnesium oxide, nickel oxide, iron oxide, zinc oxide and zirconium oxide, carbonates such as calcium carbonate and magnesium carbonate, sulfates such as barium sulfate and calcium sulfate, metal hydroxides such as aluminum hydroxide and magnesium hydroxide, and silicates such as calcium silicate, aluminum silicate and zirconium silicate, and alumina and silica are preferred. These inorganic fillers may be used each alone or as a mixture of two or more.

The average particle diameter of the inorganic fillers used in the present invention is preferably 10–2000 nm. If the average particle diameter of the inorganic fillers is more than 2000 nm, because of small specific surface area of the inorganic filler, the inorganic filler and the resin component of the liquid crystal sealant are apt to separate from each other at the time of hot pressing after lamination of the upper and lower substrates during the production of the liquid crystal display device, and exudation of the inorganic filler occurs. As a result, adhesion strength after curing and adhesion strength after absorption of moisture are deteriorated. If the average particle diameter of the inorganic fillers is less than 10 nm, the specific surface area of the inorganic filler increases too much, and hence viscosity-of the liquid crystal sealant is too high and formation of a cell gap becomes difficult.

The content of the inorganic filler in the liquid crystal sealant used in the present invention is 5–45% by weight, more preferably 15–35% by weight in the total liquid crystal sealant. If the content of the inorganic filler is less than 5% by weight, the liquid crystal sealant is low in viscosity because of small content of the filler to exude at the time of hot pressing in the production of the liquid crystal display device. If the content is more than 45% by weight, due to the too high content of the filler, the filler are hardly ruptured and the gap of the liquid crystal display device cannot be formed.

As the inorganic fillers in the present invention, it is preferred to use amorphous alumina and/or crushed silica, and it is more preferred to use amorphous alumina and crushed silica in combination. The amorphous alumina usable in the present invention is non-crystalline alumina having no specific crystal structure, is amorphous in its shape and has a particle size of about 0.01–5 μm. The average particle diameter of the preferred amorphous alumina used in the present invention is 0.01–2 μm. The crushed silica used in the present invention is obtained by crushing crystalline silica, fused silica or the like, and hence has a square shape, and is about 0.01–5 μm in particle size. The average particle diameter of the preferred crushed silica used in the present invention is 0.01–2 μm.

The content of the amorphous alumina and/or crushed silica in the liquid crystal sealant is 5–45% by weight, more preferably 15–35% by weight. If the content of the inorganic filler is less than 5% by weight, the liquid crystal sealant is low in viscosity because of small content of the filler, and shape of seal is sometimes disordered during screen printing. If the content of the inorganic filler is more than 45% by weight, since the content of the filler is too large, the liquid crystal sealant can hardly be printed through meshes of a screen mask, which sometimes causes blurring in printing. Furthermore, in the case of using amorphous alumina and/or crushed silica as inorganic filler, a preferred embodiment in the liquid crystal sealant of the present invention is that the content of the epoxy resin represented by the formula (1) is 5–30% by weight in the liquid crystal sealant and the content of the inorganic filler is 5–45% by weight in the liquid crystal sealant.

An organic filler may be added to the liquid crystal sealant of the present invention so long as it does not affect the characteristics of the liquid crystal sealant. The organic fillers include, for example, polymer beads and rubber filler of core-shell type. These fillers may be used each alone or as a mixture of two or more. The average particle diameter of the organic fillers is not more than 3 μm, preferably not more than 2 μm. If the average particle diameter of the organic fillers is more than 3 μm, formation of the cell gap becomes difficult. The amount of the organic fillers which can be added is not more than 50% by weight based on the weight of the inorganic fillers, and if it is more than 50% by weight, the viscosity is too high and formation of the cell gap becomes difficult.

If necessary, a coupling agent can be added to the liquid crystal sealant of the present invention. Examples of the coupling agent are silane coupling agents such as 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-phenyl-γ-aminopropyltrimethoxysilane, N-(2-aminoethyl)3-aminopropylmethyldimethoxysilane, N-(2-aminoethyl)3-aminopropylmethyltrimethoxysilane, 3-aminopropyltriethoxysilane, 3-mercaptopropyltrimethoxysilane, vinyltrimethoxysilane, N- (2-(vinylbenzylamoino) ethyl) 3-aminopropyltrimethoxysilane hydrochloride, 3-methacryloxypropyltrimethoxysilane, 3-chloropropylmethyldimethoxysilane and 3-chloropropyltrimethoxysilane, titanium-based coupling agents such as isopropyl(N-ethylaminoethylamino) titanate, isopropyltriisostearoyl titanate, titanium di(dioctylpyrophosphate) oxyacetate, tetraisopropyldi(dioctylphosphite) titanate and neoalkoxytri(p-N-(β-aminoethyl)aminophenyl) titanate, and zirconium- or aluminum-based coupling agents such as Zr-acetylacetonate, Zr-methacrylate, Zr-propionate, neoalkoxy zirconate, neoalkoxytrisneodecanoyl zirconate, neoalkoxytris(dodecanoyl)benzenesulfonyl zirconate, neoalkoxytris(ethylenediaminoethyl) zirconate, neoalkoxytris(m-aminophenyl) zirconate, ammonium zirconium carbonate, Al-acetylacetonate, Al-methacrylate and Al-propionate. Silicone coupling agents are preferred, and aminosilane coupling agents are more preferred. By using the coupling agent, there are obtained liquid crystal sealants excellent in reliability in moisture resistance and less in reduction of adhesion strength after absorption of moisture.

When coupling agent is added, the amount is about 0.1–15% by weight in the liquid crystal sealant.

The liquid crystal sealant of the present invention may contain a solvent in order to reduce the viscosity of the sealant at the time of coating for improving the operability of coating on the substrate. The solvents usable include, for example, alcohol solvents, ether solvents, acetate solvents and dibasic acid dimethyl ester solvents. These may be used each alone or as a mixture of two or more, and in an optional amount.

Examples of the alcohol solvents are alkyl alcohols such as ethanol and isopropyl alcohol, and alkoxy alcohols such as 3-methyl-3-methoxy butanol, 3-methyl-3-ethoxy butanol, 3-methyl-3-n-propoxy butanol, 3-methyl-3-isopropoxy butanol, 3-methyl-3-n-butoxy butanol, 3-methyl-3-isobutoxy butanol, 3-methyl-3-sec-butoxy butanol and 3-methyl-3-tert-butoxy butanol.

Examples of the ether solvents are monohydric alcohol ether solvents, alkylene glycol monoalkyl ether solvents, alkylene glycol dialkyl ether solvents, dialkylene glycol alkyl ether solvents, and trialkylene glycol alkyl ether solvents.

Examples of the monohydric alcohol ether solvents are 3-methyl-3-methoxy butanol methyl ether, 3-methyl-3-ethoxy butanol ethyl ether, 3-methyl-3-n-butoxy butanol ethyl ether, 3-methyl-3-isobutoxy butanol propyl ether, 3-methyl-3-sec-butoxy butanol-isopropyl ether and 3-methyl-3-tert-butoxy butanol-n-butyl ether.

Examples of the alkylene glycol monoalkyl ether solvents are propylene glycol monomethyl ether, propylene glycol monoethyl ether, propylene glycol monopropyl ether, propylene glycol monoisopropyl ether, propylene glycol mono-n-butyl ether, propylene glycol monoisobutyl ether, propylene glycol mono-sec-butyl ether, propylene glycol mono-tert-butyl ether, ethylene glycol monomethyl ether, ethylene glycol monoethyl ether, ethylene glycol monopropyl ether, ethylene glycol monoisopropyl ether, ethylene glycol mono-n-butyl ether, ethylene glycol monoisobutyl ether, ethylene glycol mono-sec-butyl ether and ethylene glycol mono-tert-butyl ether.

Examples of alkylene glycol dialkyl ether solvents are propylene glycol dimethyl ether, propylene glycol diethyl ether, propylene glycol dipropyl ether, propylene glycol diisopropyl ether, propylene glycol di-n-butyl ether, propylene glycol diisobutyl ether, propylene glycol di-sec-butyl ether, propylene glycol di-tert-butyl ether, ethylene glycol dimethyl ether, ethylene glycol diethyl ether, ethylene glycol dipropyl ether, ethylene glycol diisopropyl ether, ethylene glycol di-n-butyl ether, ethylene glycol diisobutyl ether, ethylene glycol di-sec-butyl ether and ethylene glycol di-tert-butyl ether.

Examples of the dialkylene glycol alkyl ether solvents are dipropylene glycol methyl ether, dipropylene glycol ethyl ether, dipropylene glycol dipropyl ether, dipropylene glycol diisopropyl ether, dipropylene glycol di-n-butyl ether, dipropylene glycol diisobutyl ether, dipropylene glycol di-sec-butyl ether, dipropylene glycol di-tert-butyl ether, diethylene glycol dimethyl ether (diglyme), diethylene glycol diethyl ether, diethylene glycol dipropyl ether, diethylene glycol diisopropyl ether, diethylene glycol di-n-butyl ether, diethylene glycol diisobutyl ether, diethylene glycol di-sec-butyl ether and diethylene glycol di-tert-butyl ether.

Examples of trialkylene glycol alkyl ether solvents are tripropylene glycol dimethyl ether, tripropylene glycol diethyl ether, tripropylene glycol dipropyl ether, tripropylene glycol diisopropyl ether, tripropylene glycol di-n-butyl ether, tripropylene glycol diisobutyl ether, tripropylene glycol di-sec-butyl ether, tripropylene glycol di-tert-butyl ether, triethylene glycol dimethyl ether, triethylene glycol diethyl ether, triethylene glycol dipropyl ether, triethylene glycol diisopropyl ether, triethylene glycol di-n-butyl ether, triethylene glycol diisobutyl ether, triethylene glycol di-sec-butyl ether and triethylene glycol di-tert-butyl ether.

Examples of the acetate solvents are alkylene glycol monoalkyl ether acetates such as ethylene glycol monomethyl ether acetate, ethylene glycol monoethyl ether acetate, ethylene glycol monopropyl ether acetate, ethylene glycol monoisopropyl ether acetate, ethylene glycol mono-n-butyl ether acetate, ethylene glycol mono-sec-butyl ether acetate, ethylene glycol monoisobutyl ether acetate, ethylene glycol mono-tert-butyl ether acetate, propylene glycol monomethyl ether acetate, propylene glycol monoethyl ether acetate, propylene glycol monoisopropyl ether acetate, propylene glycol monopropyl ether acetate, propylene. glycol monon-butyl ether acetate, propylene glycol mono-sec-butyl ether acetate, propylene glycol monoisobutyl ether acetate, propylene glycol mono-tert-butyl ether acetate, 3-methyl-3-methoxybutyl acetate, 3-methyl-3-ethoxybutyl acetate, 3-methyl-3-propoxybutyl acetate, 3-methyl-3-isopropoxybutyl acetate, 3-methyl-3-n-butoxyethyl acetate, 3-methyl-3-isobutoxybutyl acetate, 3-methyl-3-sec-butoxybutyl acetate and 3-methyl-3-tert-butoxybutyl acetate, ethylene glycol diacetate, diethylene glycol diacetate, triethylene glycol diacetate, propylene glycol diacetate, dipropylene glycol diacetate, tripropylene glycol diacetate, and butyl acetate.

The dibasic acid dimethyl esters include, for example, esters shown by $CH_3OCO—(—CH_2—)_n—COOCH_3$ (n=2–4). Examples of such esters are dimethyl glutarate ester, dimethyl adipate ester and dimethyl succinate ester. These may be used as a mixture of two or more. As a mixture of three of them, for example, RHODIASOLVE RPDE (manufactured by Rhodia Nikka Co., Ltd.) is commercially available.

In the present invention, the dibasic acid dimethyl esters can be used in combination with other solvents. The preferred solvents usable in combination with the dibasic acid dimethyl esters include, for example, ethylene glycol dibutyl ether.

As for the amount of the solvents, they can be used in an optional amount necessary for adjusting the viscosity of the liquid crystal sealant to such a value as being able to coat the sealant by a method of dispenser coating, screen printing or the like, and said viscosity is, for example, about 20–40 Pa·s at 25° C. The solvents are used in such a manner that nonvolatile matters are contained in an amount of usually 70% by weight or more, preferably 85–95% by weight, more preferably 90–95% by weight in the liquid crystal sealant. In production of liquid crystal display devices using the liquid crystal sealant containing the solvent, the upper and lower substrates are laminated after volatilizing the solvent by drying at the time of pre-curing with heating after coating the liquid crystal sealant.

The viscosity of the liquid crystal sealant after volatilization of the solvent by drying is preferably 500–50000 Pa·s, more preferably 800–10000 Pa·s in measurement of viscosity (30° C.) according to measurement of dynamic viscoelasticity.

In producing a liquid crystal display device using the liquid crystal sealant of the present invention, the liquid crystal sealant is usually subjected to continuous screen printing on a substrate provided with a color filter layer under down flow air. In order to inhibit the liquid crystal sealant from thickening at the production step under down flow air, it is preferred to use a solvent having both the high boiling point and the low vapor pressure. Specifically, preferred are those having a boiling point of 200° C. or higher under 1013.25 hPa and a vapor pressure of 20 Pa or lower at 20° C. Preferable solvents are, for example, ethylene glycol dibutyl ether, dibasic acid dimethyl esters and triethylene glycol dimethyl ether. The dibasic acid dimethyl esters include, for example, dimethyl glutarate ester, dimethyl succinate ester and dimethyl adipate ester. These compounds may be used as a mixture of two or more. These compounds are commercially available, and specific commercially available compounds include RPDE (manufactured by Rhodia Nikka Co., Ltd.) which is a mixed solvent of dimethyl glutarate ester, dimethyl succinate ester and dimethyl adipate ester. The amount of these solvents is about 1–50% by weight, preferably 3–30% by weight in the liquid crystal sealant.

The liquid crystal sealant of the present invention can be prepared by dissolving the above-mentioned epoxy resin, curing agent and, if necessary, solvent by mixing them under stirring and heating, further adding thereto the inorganic filler and, if necessary, other fillers, finely dispersing the mixture by a known mixing apparatus such as ball mill, sand mill or three-rolls, and then further adding given amounts of the curing accelerator, and, if necessary, the coupling agent, an anti-foaming agent, a leveling agent and the like, followed by mixing.

In the liquid crystal display device of the present invention, a pair of substrates having given electrodes formed thereon are positioned opposite to each other at a given space, the periphery of them is sealed with the liquid crystal sealant of the present invention, and a liquid crystal is confined in the space between the substrates. The liquid crystal to be confined is not particularly limited. The liquid crystal display device means a liquid crystal panel comprising a pair of substrates between which a liquid crystal is confined and which is provided with a polarizing plate, a circuit for driving, a cable for input of signals, a back light, etc. Here, the substrates are comprised of a combination of substrates which are made of glass, quartz, plastics, silicon, or the like and at least one of which is light transmissive. The device can be produced, for example, in the following manner. First, a spacer (space controlling material) such as glass fiber is added to the liquid crystal sealant of the present invention. The spacer includes, for example, glass fiber, silica beads and polymer beads. The diameter thereof is selected depending on the cell gap of the liquid crystal display device to be made, and is usually 0.5–10 μm. The amount of the spacer used is about 0.1–4 parts by weight, preferably about 0.5–2 parts by weight, more preferably about 0.9–1.5 part by weight based on 100 parts by weight of the liquid crystal sealant of the present invention. The liquid crystal sealant to which the spacer is added is coated on one of a pair of the substrates by a dispenser or the like, then the solvent is evaporated by heating, for example, at 90° C. for 10 minutes, subsequently the opposing substrates are laminated, and the gap is removed by a hot press, followed by carrying out the curing at 120–160° C. for 1–2 hours to obtain the device.

Furthermore, for producing a liquid crystal display device having a liquid crystal material which is interposed between a substrate having a color filter layer and a substrate having a liquid crystal orientation layer on the electrode layer and is held by the liquid crystal sealant, the liquid crystal sealant is coated on one of the substrates by screen printing, and another substrate is hot press bonding thereto, and the liquid crystal material is poured in the space between the substrates. The hot press bonding may be carried by a sheeting press or multiplaten hot press under normal pressure or reduced pressure.

For carrying out screen printing of the liquid crystal sealant continuously and stably for a long time, it is preferred to use a liquid crystal sealant having physical properties of $\eta 2 < 60 (Pa \cdot s)$ and $\eta 2/\eta 1 < 1.5$ (where $\eta 1$ is a viscosity of the liquid crystal sealant before carrying out the screen printing and $\eta 2$ is a viscosity of the liquid crystal sealant after carrying out the continuous printing). The viscosity is measured by an E-type viscometer.

In screen printing of the liquid crystal sealant, the liquid crystal sealant is cast on a screen printing plate, and since the production is naturally carried out in a clean room, the liquid crystal sealant is exposed to down flow air, and the solvent contained is gradually volatilized from the surface of the liquid crystal sealant to cause increase of viscosity of the sealant. When the viscosity of the liquid crystal sealant increases to 60 Pa·s or higher, there sometimes occur such problems that shape of the printed seal is deteriorated (blurring, thinning, thickening, breaking), breakage of seal occurs due to clogging of meshes of screen printing plate, and the surface of the liquid crystal sealant becomes too hard at the temporary baking step to cause deterioration of adhesion to the opposing substrates. When the viscosity η2 after continuous printing is more than 1.5 time the viscosity η1 at the beginning of the printing, blurring, thinning and breakage sometimes occur unless the screen printing conditions which are initially set, such as printing speed, are changed. For changing the printing conditions during continuous printing, the production must be once stopped and the printing conditions must be reviewed, and these procedures cause deterioration of production efficiency, which is not preferred.

The present invention will be explained in more detail by the following examples, which should not be construed as limiting the invention in any manner.

EXAMPLE 1

100 g of an epoxy resin represented by the formula (1) (RE-600NM manufactured by Nippon Kayaku Co., Ltd., which contained 65–80% by weight of the compound of n=0 in the formula (1)) and 30 g of a phenol novolak resin containing 30–50% by weight of a compound having two rings (PN-152 manufactured by Nippon Kayaku Co., Ltd.) as a curing agent were dissolved with heating in 10 g of RHODIASOLVE RPDE (comprising 57–63% by weight of dimethyl glutarate, 21–27% by weight of dimethyl succinate, 12–20% by weight of dimethyl adipate; manufactured by Rhodia Nikka Co., Ltd.) as a solvent. In the resulting resin solution were dispersed 60 g of spherical alumina having an average particle diameter of about 30 nm (NANOTEC ALUMINA SP-C manufactured by CI Kasei Co., Ltd.) as an inorganic filler and 10 g of N-phenyl-γ-aminopropyltrimethoxysilane as a coupling agent by mixing them with a sand mill, followed by adding 8 g of AMICURE MYH-K having an average particle diameter of 3 μm or less (amine adduct: manufactured by Ajinomoto Fine Techno Co., Ltd.) as a curing accelerator to obtain a liquid crystal sealant of the present invention.

COMPARATIVE EXAMPLE 1

100 g of a liquid bisphenol A type epoxy resin (RE-310S manufactured by Nippon Kayaku Co., Ltd.) and 30 g of a phenol novolak resin containing 30–50% by weight of a compound having two rings (PN-152 manufactured by Nippon Kayaku Co., Ltd.) as a curing agent were dissolved with heating in 30 g of RHODIASOLVE RPDE as a solvent. In the resulting resin solution were dispersed 60 g of spherical alumina having an average particle diameter of about 30 nm (NANOTEC ALUMINA SP-C manufactured by CI Kasei Co., Ltd.) as an inorganic filler and 10 g of N-phenyl-γ-aminopropyltrimethoxysilane as a coupling agent by mixing them with a sand mill, followed by adding 8 g of AMICURE MYH-K having an average particle diameter of 3 μm or less (amine adduct: manufactured by Ajinomoto Fine Techno Co., Inc.) as a curing accelerator to obtain a liquid crystal sealant.

COMPARATIVE EXAMPLE 2

100 g of a liquid bisphenol A type epoxy resin (RE-310S manufactured by Nippon Kayaku Co., Ltd.), 10 g of dihydrazide adipate as a curing agent, 20 g of RHODIASOLVE RPDE, 60 g of spherical alumina having an average particle diameter of about 30 nm (NANOTEC ALUMINA SP-C manufactured by CI Kasei Co., Ltd.) as an inorganic filler and 10 g of N-phenyl-γ-aminopropyltrimethoxysilane as a coupling agent were mixed and dispersed to obtain a liquid crystal sealant. A three-roll was used for the mixing and dispersing. Since there was the possibility of the liquid crystal sealant of Comparative Example 2 being cured with heat generated at the sand mill, the three-roll was used in place of the sand mill.

TEST EXAMPLE 1

(A) Measurement of Viscoelasticity After Volatilization of Solvent:

The liquid crystal sealant was coated on a glass substrate and was spread to a thickness of 25 μm using an applicator having a clearance of 25 μm. Then, the glass substrate coated with the sealant was left to stand for 5 minutes on a hot plate heated to 90° C. Thereafter, the sealant was scraped off from the glass substrate, and was formed into a column of 20 mm in diameter and 1 mm in thickness. The complex viscosity coefficient of the resulting sample was measured by a dynamic viscoelasticity measuring apparatus (Rheosol-G5000 manufactured by UBM Co., Ltd.). The dynamic viscoelasticity measuring apparatus was set as follows:

Cone: Parallel cone of 20 mm in diameter; frequency: 0.1 Hz; strain angle: 0.1 deg.; measuring temperature: 30° C. The results are shown in Table 1.

(B) Test of Measuring a Width of Seal when the Liquid Crystal Sealant was Pre-cured and then a Load was Applied thereto:

One gram of a glass fiber having a diameter of 5 μm (PF-50S manufactured by Nippon Electric Glass Co., Ltd.) as a spacer was added to 100 g of the resulting liquid crystal sealant, followed by mixing by stirring. This liquid crystal sealant was coated by a dispenser on a glass substrate of 50 mm×50 mm so as to give a spreading of seal of 1 mm when a gap of 5 μm was formed, and was pre-cured by heating with a hot plate at 90° C. for 5 minutes. Then, on this glass substrate was superposed a glass substrate of the same size at 25° C., followed by applying a load of 2 kg/cm$^2$ to crush the sealant, and the extended width of seal was confirmed by a microscope. The results are shown in Table 1.

In Table 1, "good" means a seal width of 0.3 mm or more, and "bad" means a seal width of less than 0.3 mm.

(C) Test on Water Absorption of Liquid Crystal Sealant:

The resulting liquid crystal sealant was coated on a glass substrate at a thickness of 25 μm. The coat was subjected to drying of solvent by heating at 100° C. for 10 minutes and cured at 150° C. for 60 minutes. Then, the coated glass substrate was introduced into a thermo-hygrostat in an atmosphere of 60° C. and 90% for 24 hours, and water absorption was calculated from the ratio of weight before and after introduction into the thermo-hygrostat. The results are shown in Table 1.

(D) Test on Moisture Permeability of Liquid Crystal Sealant:

The test was conducted in accordance with JIS Z0208. That is, the resulting liquid crystal sealant was coated on a polyimide film at a thickness of 50 μm. The coat was subjected to drying of solvent by heating at 100° C. for 10 minutes and cured at 150° C. for 60 minutes. Then, the liquid crystal sealant was peeled off from the polyimide film and further cured at 150° C. for 60 minutes. A suitable amount of calcium chloride was charged in a moisture permeable cup, and the cured liquid crystal sealant was cut in conformity with the moisture permeable cup and set in the cup, and the cup was sealed with paraffin. Thereafter, the moisture permeable cup was introduced into a thermo-hygrostat in an atmosphere of 60° C. and 90% for 24 hours, and water absorption was calculated from the ratio of weight before and after introduction into the thermo-hygrostat. The results are shown in Table 1.

TABLE 1

Results of evaluation of liquid crystal sealant

| Test items | Example 1 | Comparative Example 1 | Comparative Example 2 |
|---|---|---|---|
| (A) Viscoelasticity (Pa · s) | 1110 | 107000 | 1020 |
| (B) Seal width test | Good | Bad | Good |
| (C) Water absorption (%)(60° C., 90% Rh, 24 h) | 1.0 | 1.0 | 3.7 |
| (D) Moisture Permeability (%) (g/m² · 24 h) | 40 | 42 | 80 |

As can be seen from (A) of Table 1, the liquid crystal sealant of Example 1 is lower in viscoelasticity after volatilization of solvent than the liquid crystal sealant of Comparative Example 1, and the liquid crystal sealant of Comparative Example 1 has a very high viscosity. Therefore, it can be suggested that the liquid crystal sealant of Example 1 is smaller than the liquid crystal sealant of Comparative Example 1 in load of press at the time of lamination of the upper and lower substrates in production of a liquid crystal display device, and hence in the case of using the liquid crystal sealant of Example 1, the registration step can be performed in a shorter time. Furthermore, as can be seen from (B) of Table 1, the liquid crystal sealant of Example 1 is better than the liquid crystal sealant of Comparative Example 1 in the state at room temperature after pre-curing. Moreover, as can be seen from (C) and (D) of Table 1, the water absorption and moisture permeability are better in Example 1 than in Comparative Example 2.

EXAMPLE 2

(1) Synthesis of Liquid Crystal Sealant:

100 g of an epoxy resin represented by the formula (1) (RE-600NM manufactured by Nippon Kayaku Co., Ltd., which contained 65–80% by weight of the compound of n=0 in the formula (1)) and 30 g of a phenol novolak resin containing 30–50% by weight of a compound having two rings (PN-152 manufactured by Nippon Kayaku Co., Ltd.) as a curing agent were dissolved with heating in 10 g of RHODIASOLVE RPDE (having a boiling point of 200–230° C. under 1013.25 hPa and a vapor pressure of 6 Pa at 20° C.; containing 57–63% by weight of dimethyl glutarate, 21–27% by weight of dimethyl succinate and 12–20% by weight of dimethyl adipate; manufactured by Rhodia Nikka Co., Ltd.) as a solvent. In the resulting resin solution were dispersed 60 g of spherical alumina having an average particle diameter of about 30 nm (NANOTEC ALUMINA SP-C manufactured by CI Kasei Co., Ltd.) as an inorganic filler and 10 g of N-phenyl-γ-aminopropyltrimethoxysilane as a coupling agent by mixing them with a sand mill, followed by adding 8 g of AMICURE MYH-K having an average particle diameter of 3 μm or less (amine adduct: manufactured by Ajinomoto Fine Techno Co., Ltd.) as a curing accelerator to obtain a liquid crystal sealant of the present invention.

(2) Production of Liquid Crystal Display Device:

A liquid crystal orientation material such as a polyimide material was coated by offset printing method on an array substrate comprising glass and having thereon an active element, a wiring and a transparent electrode and a color filter-side substrate having thereon color filters comprising red, blue and green, a black matrix for light screening and a transparent electrode comprising ITO as an opposite substrate. Then, these substrates were subjected to temporary baking at 50–100° C. for 1–10 minutes and real baking at 160–220° C. for 0.5–3 hours to obtain a liquid crystal orientation layer, followed by subjecting both the substrates to liquid crystal molecule orientation treatment such as rubbing.

Thereafter, the above liquid crystal sealant was coated on the color filter-side substrate by screen printing method. A suitable amount of a glass fiber having a desired diameter was added to the liquid crystal sealant for maintaining the cell thickness. The initial viscosity η1 of liquid crystal sealant A was 22.5 Pa·s. Substrates for liquid crystal panel were produced by continuous screen printing of about 7 hours, and the viscosity μ2 of the liquid crystal sealant after the continuous printing was 28.4 Pa·s. That is, η2<60 and η2/η1=1.26.

The shape of seal after seal continuous printing was satisfactory without breakage and blurring, and clogging of screen of screen printing plate did not occur.

The sealant was subjected to removal of solvent (the remaining solvent was less than 10 ppm) by temporary baking at 50–100° C. for 1–30 minutes by a hot plate after the seal printing.

On the other hand, the array-side substrate was sprayed with a spherical spacer made of plastics for the formation of cell thickness by dry spraying method.

Thereafter, the color filter-side substrate and the array-side substrate were temporarily adhered to each other, and after positional alignment, these opposing substrates were subjected to hot press bonding at 150–200° C. for 0.5–3 hours to laminate and fix the opposing substrates so as to give a uniform thickness in a given range.

These opposing substrates were cut to a given shape, then a nematic liquid crystal material was poured thereinto by vacuum pouring method, and the pouring hole was sealed with an ultraviolet-curing type resin to obtain a liquid crystal display device.

The liquid crystal display device made by the method of the present invention was free from defects such as breakage, thinning and blurring of the seal which may be caused by the seal printing.

COMPARATIVE EXAMPLE 3

(1) Synthesis of Liquid Crystal Sealant:

100 g of a liquid bisphenol A type epoxy resin (RE-310S manufactured by Nippon Kayaku Co., Ltd.) and 30 g of a phenol novolak resin containing 30–50% by weight of a compound having two rings (PN-152 manufactured by Nippon Kayaku Co., Ltd.) as a curing agent were dissolved with heating in 30 g of propylene glycol diacetate (having a boiling point of 190° C. under 1013.25 hPa and a vapor pressure of 31 Pa at 20° C.) as a solvent. In the resulting resin solution were dispersed 60 g of spherical alumina having an average particle diameter of about 30 nm (NANOTEC ALUMINA SP-C manufactured by CI Kasei Co., Ltd.)

as an inorganic filler and 10 g of N-phenyl-γ-aminopropyltrimethoxysilane as a coupling agent by mixing them with a sand mill, followed by adding 8 g of AMICURE MYH-K having an average particle diameter of 3 μm or less (manufactured by Ajinomoto Fine Techno Co., Ltd.) as a curing accelerator to prepare a liquid crystal sealant.

(2) Production of Liquid Crystal Display Device:

In the same manner as in Example 2, a liquid crystal orientation layer was formed on an array-side substrate and a color filter-side substrate, followed by subjecting to orientation treatment.

Thereafter, the above liquid crystal sealant B was coated on the color filter-side substrate by screen printing method. A suitable amount of a glass fiber having a desired diameter was added to the liquid crystal sealant for maintaining the cell thickness. The initial viscosity η1 of the liquid crystal sealant was 30.5 Pa·s. Substrates for liquid crystal panel were produced by continuous screen printing of about 7 hours, and the viscosity η2 of the liquid crystal sealant after the continuous printing was 102 Pa·s. That is, η2<60 and η2/η1=3.34.

In the shape of seal after the seal continuous printing, there occurred disorder in seal width and narrow portions. Furthermore, there occurred local breakage of seal and the screen printing plate was partially clogged.

Thereafter, the substrates were laminated and cut and the liquid crystal was poured in the same manner as in Example 2 to obtain a liquid crystal display device. There occurred failures in seal such as breakage and thinning of the seal and uneven thickness of the cell at the rate of about 5%.

EXAMPLE 3

(1) Synthesis of Liquid Crystal Sealant:

30 g of an epoxy resin represented by the formula (1) (RE-600NM manufactured by Nippon Kayaku Co., Ltd., which contained 65–80% by weight of the compound of n=0 in the formula (1)), 70 g of a bisphenol A type epoxy resin (RE-310S manufactured by Nippon Kayaku Co., Ltd.) and 30 g of a phenol novolak resin containing 30–50% by weight of a compound having two rings (PN-152 manufactured by Nippon Kayaku Co., Ltd.) as a curing agent were dissolved with heating in 7 g of RHODIASOLVE RPDE (containing 57–63% by weight of dimethyl glutarate, 21–27% by weight of dimethyl succinate, 12–20% by weight of dimethyl adipate; manufactured by Rhodia Nikka Co., Ltd.) and 3 g of ethylene glycol dibutyl ether (manufactured by Wako Jun-Yaku Kogyo Co., Ltd.) as solvents.

In the resulting resin solution were dispersed 25 g of amorphous alumina having an average particle diameter of about 30 nm (ALUMICRON FAL-0.05B manufactured by Fujimi Incorporated) and 25 g of crushed silica having an average particle diameter of 0.5 μm (CRYSYALITE 1FF manufactured by Tatsumori Co., Ltd.) as inorganic fillers and 9 g of N-phenyl-γ-aminopropyltrimethoxysilane as a coupling agent by mixing them with a sand mill, followed by adding 7 g of AMICURE MYH-K having an average particle diameter of 3 μm or less (manufactured by Ajinomoto Fine Techno Co., Ltd.) as a curing accelerator to obtain a liquid crystal sealant of the present invention.

(2) Production of Liquid Crystal Display Device:

A liquid crystal orientation material such as a polyimide material was coated by offset printing method on an array substrate comprising glass and having thereon a given active element, wiring and transparent electrode and a color filter substrate having thereon color filters comprising red, blue and green, a black matrix for light screening and a transparent electrode comprising ITO. Then, these substrates were subjected to temporary baking at 50–100° C. for 1–10 minutes and real baking at 160–220° C. for 0.5–3 hours to obtain a liquid crystal orientation layer, followed by subjecting both the substrates to liquid crystal molecule orientation treatment such as rubbing.

Thereafter, the above liquid crystal sealant was coated on the color filter-side substrate by screen printing method. A suitable amount of a glass fiber having a desired diameter was added to the liquid crystal sealant for maintaining the cell thickness. In mass-production of substrates for liquid crystal panel, screen printing was carried out continuously in a clean room under down flow. The treating time was about 7 hours.

The shape of seal at the beginning of seal printing and after continuous printing was satisfactory without occurrence of foams, breakage and blurring (see FIG. 1). Further, clogging of screen of screen printing plate did not occur after the continuous printing.

Temporary baking was carried out at 50–100° C. for 1–30 minutes by a hot plate after the seal printing. The temporary baking was for the purpose of removing the solvent in the seal. It is preferred to select the temporary baking temperature at which the removal os solvent could be performed with containing less than 10 ppm of the solvent and which was lower than the heat activation temperature of the curing agent. The removal of solvent can be performed even at a temporary baking temperature higher than 100° C., but processing precision for the cell thickness tends to deteriorate due to the proceeding of thickening and curing reaction at such temperature, and care must be taken in this respect.

On the other hand, the array-side substrate was sprayed with a spherical spacer made of plastic for the formation of cell thickness by dry spraying method. Thereafter, the color filter substrate after subjected to temporary baking of the seal and the substrate after sprayed with the spherical spacer were subjected to temporary bonding and positional alignment, and then these opposite substrates were subjected to hot press bonding at 150–200° C. for 0.5–3 hours to laminate and fix the opposing substrates so as to give a uniform thickness in a given range.

When the above hot pressing and bonding step was carried out not by a normal or reduced pressure sheeting hot press, but by a multiplaten press, there were caused no problems.

These opposing substrates were cut to a given shape, then, for example, a nematic liquid crystal material was poured thereinto by vacuum pouring method, and the pouring hole was sealed with an ultraviolet-curing type resin. The liquid crystal display device produced by the method of the present invention was free from defects such as breakage, thinning and blurring of the seal which may be caused by the seal printing.

As mentioned above, liquid crystal display devices can be produced without problems in seal shape and with high efficiency and high reproducibility by using the liquid crystal sealant of the present invention.

The heat-curable liquid crystal sealant of the present invention is very effective to make a liquid crystal display device with requiring only a short time for the registration step at the time of lamination of the upper and lower substrates in making the liquid crystal display device, and causing no separation of the upper and lower substrates when the upper and lower substrates laminated with uncured liquid crystal sealant is carried by elevating the upper substrate by the vacuum chucking method, and with excellent reliability in moisture resistance.

What is claimed is:

1. A liquid crystal sealant, characterized by comprising an epoxy resin represented by the following formula (1):

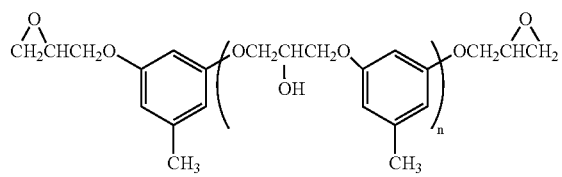

[Formula 1]

(1)

(in the formula, n represents an average polymerization degree and is a positive number of 0–5), a curing agent, a latent curing accelerator and an inorganic filler.

2. A liquid crystal sealant according to claim 1, wherein the epoxy resin contains 50–95% by weight of a compound of the formula (1) in which n is 0.

3. A liquid crystal sealant according to claim 1 or 2, wherein a bisphenol A type epoxy resin is used together with the epoxy resin.

4. A liquid crystal sealant according to claim 1, wherein the curing agent is a novolak resin.

5. A liquid crystal sealant according to claim 4, wherein the novolak resin contains 20–80% by weight of a compound having two rings.

6. A liquid crystal sealant according to claim 1, wherein the latent curing accelerator is an amine adduct and has an average particle diameter of not more than 6 μm.

7. A liquid crystal sealant according to claim 1, wherein the inorganic filler is alumina and/or silica.

8. A liquid crystal sealant according to claim 1, wherein the inorganic filler is amorphous alumina and/or crushed silica.

9. A liquid crystal sealant according to claim 1 which contains an organic solvent.

10. A liquid crystal sealant according to claim 9, wherein the organic solvent has a boiling point of not lower than 200° C. under 1013.25 hPa and a vapor pressure of not higher than 20 Pa at 20° C.

11. A liquid crystal sealant according to claim 9 or 10, wherein the organic solvent is a dibasic acid dimethyl ester.

12. A liquid crystal sealant according to claim 11 which additionally contains ethylene glycol dibutyl ether as an organic solvent.

13. A liquid crystal sealant according to claim 1 which contains a coupling agent.

14. A liquid crystal sealant according to claim 13, wherein the coupling agent is an aminosilane coupling agent.

15. A liquid crystal display device sealed with the liquid crystal sealant according to claim 1.

16. A method for producing a liquid crystal display device having a liquid crystal material which is interposed between a substrate having a color filter layer and a substrate having a liquid crystal orientation layer on an electrode layer and which is held with a liquid crystal sealant, characterized by including a step of coating the liquid crystal sealant according to claim 1 on one of the substrates by screen printing, a step of hot-press bonding another substrate, and a step of pouring the liquid crystal material into the space between the substrates.

17. A method for producing a liquid crystal display device according to claim 16, wherein the liquid crystal sealant satisfies 72 2<60(Pa·s) and η2/η1<1.5 (where η1 is a viscosity of the liquid crystal sealant before coating by screen printing and η2 is a viscosity of the liquid crystal sealant after carrying out the continuous printing).

* * * * *